(12) United States Patent
Blume

(10) Patent No.: US 6,957,605 B1
(45) Date of Patent: Oct. 25, 2005

(54) HIGH PRESSURE PUMP PISTON

(76) Inventor: George H. Blume, 107 Morning Cloud Cove, Austin, TX (US) 78734

( * ) Notice: Subject to any disclaimer, the term of this patent is extended or adjusted under 35 U.S.C. 154(b) by 0 days.

(21) Appl. No.: 10/838,567

(22) Filed: May 4, 2004

(51) Int. Cl.$^7$ .............................................. F16J 15/32
(52) U.S. Cl. ....................... 92/240; 277/436; 277/560; 277/584
(58) Field of Search ........................ 92/240, 241, 254; 277/436, 437, 438, 549, 559, 560, 584, 589

(56) References Cited

U.S. PATENT DOCUMENTS

| | | | |
|---|---|---|---|
| 2,473,064 A | | 6/1949 | Leman |
| 4,053,166 A | * | 10/1977 | Domkowski ................. 277/558 |
| 4,268,045 A | * | 5/1981 | Traub ........................... 277/589 |
| 4,270,440 A | | 6/1981 | Lewis, II |
| 4,516,785 A | | 5/1985 | Miller et al. |
| 4,566,702 A | * | 1/1986 | Traub ........................... 277/589 |
| 4,601,235 A | * | 7/1986 | Roberts ......................... 92/245 |
| 4,735,129 A | | 4/1988 | Sjoberg |
| 4,893,823 A | * | 1/1990 | Strouse et al. ................. 92/247 |
| 5,480,163 A | * | 1/1996 | Miser et al. ................... 92/254 |
| 5,865,442 A | * | 2/1999 | Iwashita ....................... 92/240 |

* cited by examiner

Primary Examiner—Thomas E. Lazo
(74) Attorney, Agent, or Firm—Dennis W. Gilstad

(57) ABSTRACT

A high pressure piston for use within a liner for a reciprocating pump comprises an elastomeric seal and a metallic annular bearing ring having relatively high heat conductivity compared to the liner and seal. During the pump's pressure stroke a portion of the bearing ring elastically expands radially to narrow or close the extrusion gap. Narrowing the gap decreases the tendency for extrusion of piston seal elastomeric material, while closing the gap tends to block elastomer extrusion and establish sliding contact between the bearing ring and the liner. Sliding contact between the bearing ring and liner prevents portions of the piston hub (e.g., a transverse flange) from contacting the liner and damaging it. The heat-conductive bearing ring improves scavenging of frictional heat near the extrusion gap, extending the service life of piston seal elastomer while reducing bearing ring and liner wear. Under reduced pressure on the pump's return stroke, the bearing ring elastically contracts radially, slightly widening the extrusion gap. On the pump's return stroke the slightly wider extrusion gap allows cooling water directed generally toward the proximal flange of the piston hub to better cleanse, as well as cool, the liner wall.

7 Claims, 6 Drawing Sheets

HIGH PRESSURE PUMP PISTON

FIELD OF THE INVENTION

The invention relates generally to high-pressure piston pumps used, for example, in oil field drilling operations. The illustrated embodiment of the invention applies to mud pumps that incorporate structural features providing for reduced piston and liner wear and increased service life.

BACKGROUND

Engineers typically design high-pressure oil field pumps in two sections; the (proximal) power section (herein "power end") and the (distal) fluid section (herein "fluid end"). The power end usually comprises a crankshaft, reduction gears, bearings, connecting rods, crossheads, crosshead extension rods, etc. Also located in the power end of a mud pump is at least one liner within which a piston is moved in a reciprocating manner by a piston rod. Each liner comprises a cylindrical sleeve within a steel hull. Notwithstanding their location in the power end frame liners, pistons and piston rods are considered part of a mud pump's fluid end.

Commonly used mud pump fluid ends also typically comprise a suction valve and a discharge valve associated with each liner (together with its piston and piston rod) in a sub-assembly, plus retainers and high-pressure seals, etc.

FIG. 1 schematically illustrates a cross-sectional view of a typical mud pump fluid end, showing its connection to a power end frame. A plurality of sub-assemblies similar to that illustrated in FIG. 1 may be combined in a mud pump.

FIG. 2 schematically shows a cross-section of a typical mud pump liner together with its piston and piston rod. High-pressure pump piston designs for mud pumps have evolved over several decades, as indicated in U.S. Pat. Nos. 2,473,064; 4,270,440; 4,516,785; 4,601,235; 4,735,129; and 5,480,163, each patent incorporated herein by reference. The designs illustrated in these patents cover a period of more than 50 years. Each incorporates one or more structural features for reducing or preventing extrusion under high pressure of a portion of the piston's elastomeric seal material (e.g., rubber, polyurethane or analogous resilient material) into a space between the piston and the liner wall (the "extrusion gap"). The gap, as shown schematically in FIG. 2, typically arises because the outer diameter of the piston's steel hub is slightly smaller than the liner's inner diameter to permit reciprocating motion of the piston within the liner. As the liner wears the extrusion gap widens, increasing the tendency for sealing material to extrude into the gap under pressure (i.e., during a pump's pressure stroke). During extrusion, the sealing material is damaged or destroyed and the seal begins to fail. Eventually, failure of the seal leads to excessive leakage past the piston, followed by premature failure of the piston and/or the liner.

The tendency of piston seal material to extrude into the gap under pressure is aggravated by the large amounts of frictional heat generated by movement of a tight-fitting piston seal on the liner wall. Unless this heat is effectively removed, it tends to quickly degrade the seal and allow extrusion of seal material into the gap (described as a flow of elastomeric material under pressure in the '163 patent). As pieces of the resilient sealing material flowing into the gap are torn, cut and/or bitten off, excessive leakage develops between piston and liner. Continued seal degradation may allow a piston flange to contact the liner wall and damage it. The patents cited herein describe various inventions to slow seal degradation by reducing the tendency of elastomeric seal material to flow into the gap and/or by eliminating the gap altogether through use of a structure that extends from the piston to the liner wall.

One long-used method of reducing elastomeric flow into the extrusion gap is by molding and/or bonding an elastomeric seal around a strong metal rib or flange that extends radially close to the gap (see, e.g., col. 2 of the '064 patent and col. 3 of the '163 patent). Adherence of the seal material to the metal near the gap is the extrusion control device because seal material bound to the metal can not flow. When elastomer adherence to the metal fails, seal material flows into the gap (i.e., seal extrusion) causing the seal to fail (i.e., to allow excessive leakage of the pumped fluid past the piston). Seal failure also allows the piston's metal rib or flange to contact the liner wall, often leading to galling and rapidly increasing liner wear.

Elastomeric flow through the extrusion gap may also be reduced when a portion of the elastomeric seal near the gap is reinforced by, for example, fabric (see, e.g., col. 4 of the '235 patent and col. 3 of the '129 patent). Reinforcement may also be provided through use of elastomers of different hardness in the piston seal (e.g., dual-durometer urethane seals), with the harder elastomer nearest the extrusion gap. But dual-durometer seals are difficult and expensive to produce with uniformly predictable characteristics. In particular, failure of the intra-seal bond between the harder and softer elastomers may lead to failure of the entire seal. Single-durometer seals avoid the problems of establishing and maintaining intra-seal bonds, so they are less expensive to produce. And single-durometer seals perform adequately except in high-heat and/or high-pressure applications (i.e., except in areas near the extrusion gap), where elevated temperatures rapidly degrade them.

In another of the piston seal embodiments cited above, a relatively rigid split ring (e.g., made from a metal such as steel or cast iron) is bonded to an elastomeric seal that is intended to control expansion of the ring to ideally just "kiss" the liner, thus closing the extrusion-gap (see, e.g., col. 5 of the '785 patent). Unfortunately, since a split ring will not radially expand uniformly around its entire circumference, ideal (i.e., complete) closure of the extrusion gap can not be obtained by practicing the invention of the '785 patent.

An alternative approach to blocking or reducing elastomeric flow is described in the '163 patent, wherein an annular flange combined with an axially-extending annular skirt forms a relatively rigid reinforcement section that prevents elastomeric material radially inward of the skirt from bulging outwardly towards the circumference of the piston (see, e.g., cols. 3 and 4 of the '163 patent). Elastomeric material radially outward of the skirt, on the other hand, is still subject to the elastomeric flow phenomenon noted above.

Yet another approach to high-pressure piston design features use of an annular gap filler ring with controlled radial creep characteristics which urge the ring into continuous contact with the liner such that an extrusion gap does not occur (see, e.g., col. 5 of the '440 patent). Glass-filled nylon is described as a material for the gap filler ring having the desired controlled radial creep characteristics (see, e.g., col. 6 of the '440 patent). But the continuous contact of the gap filler ring with the liner tends to quickly wear the liner's inner surface in a barrel shape (that is, having smaller diameters at the ends than in the middle). As liner wear continues, extraction of the piston through either end of the liner (with the gap filler ring remaining in constant liner wall contact) becomes increasingly difficult and may eventually become impossible.

The '440 patent also describes problems related to frictional heat due to the tremendous force of the piston seal on the liner wall. Dissipation of this heat is handled in the invention of the '440 patent by a plurality of water channels communicating a source of fluid from a passageway within the piston body to the liner for washing and cooling (see, e.g., cols. 1, 2 and 7 of the '440 patent). It is also common practice merely to direct a stream of water at the back of the piston for combined cooling and washing of the piston and liner wall.

The problems associated with frictional heat build-up between high-pressure pistons and liners are exacerbated by higher operating pressures and also by newer liners comprising ceramic and zirconium. Both ceramic and zirconium offer excellent corrosion resistance and a 300–400% increase in wear life over traditional hardened steel liners. But both materials are very expensive and very brittle, and they have the additional disadvantage of having lower thermal conductivity than steel. Their lower thermal conductivity means that they tend to retain the substantial frictional heat that develops when a piston with its tight-fitting seal reciprocates within a liner. This retained heat results in increased piston operating temperatures. And with prolonged exposure to retained heat, elastomeric piston seal materials (particularly urethanes) are progressively degraded. Subsequent seal failures eventually allow pistons to damage the liners in which they reciprocate, as noted above. The likelihood of such damage is relatively lower with use of liners having better thermal conductivity because the liner tends to more effectively remove heat from the piston seal-liner interface.

Compounding the problems with frictional heat retention in pistons and liners is the fact that the designs of currently available piston seals evolved during a time when typical mud pump working pressures were about 2,000 to 4,000 pounds per square inch (psi). Modern mud pumps, in contrast, may operate at pressures two to three times as high. An advanced high-pressure piston is needed that combines better scavenging of frictional heat with reduced extrusion of elastomeric seal material, simultaneously improving seal performance and reducing liner wear to extend the pump's service life.

SUMMARY OF THE INVENTION

The invention comprises a high pressure piston for use within a liner for a reciprocating pump. The piston comprises a metallic hub, a molded elastomeric seal, a circular retaining plate, and a metallic annular bearing ring comprising proximal and distal portions. The bearing ring has an inner surface, a base surface, a salient outer surface and a distal end. The bearing ring's salient outer surface comprises a proximal bearing ring outer surface and a distal bearing ring outer surface separated by a peripheral bearing ring contact surface. When the bearing ring is not under a pressure differential as described below, the peripheral bearing ring contact surface has a diameter slightly less than the liner's inner diameter. As further described below, the term salient as applied herein to the bearing ring's outer surface means projecting generally outward (in a manner analogous to the profile of, e.g., a salient in a trench line). Thus, the longitudinal profile of the bearing ring's salient outer surface may comprise smoothly-curved, angular, and/or cylindrical areas, as well as relatively small indentations and/or protuberances for achieving desired bearing ring radial expansion properties as a function of radial differential pressures applied to the bearing ring inner and outer surfaces. Such differential pressures are, in turn, functions of the pressure of fluid(s) being pumped.

Both proximal and distal bearing ring portions have relatively high heat conductivity compared to that of the liner and the elastomeric seal. Further, at least the proximal bearing ring portion has a relatively low modulus of elasticity compared to the liner wall to facilitate its elastic radial expansion and contraction for altering the width of the extrusion gap between the bearing ring and the liner wall. On the pump's pressure stroke the proximal portion of the bearing ring experiences a substantially uniformly distributed net outward radial force on its inner surface, the force being transmitted hydraulically as described below. Such an outward radial force causes the proximal portion of the bearing ring to elastically expand radially, thereby narrowing the extrusion gap. The extrusion gap narrows because the liner wall has a relatively higher modulus of elasticity than the proximal portion of the bearing ring. Thus, the liner inner diameter expands to a lesser extent than the proximal portion of the bearing ring in response to the pump's pressure stroke. When the extrusion gap is thus narrowed on the pressure stroke, the tendency for elastomeric seal extrusion under pressure is reduced. Simultaneously, the relatively high heat conductivity of the bearing ring allows effective scavenging of frictional heat (which is generated predominately during the pressure stroke) from the vicinity of the extrusion gap.

Under reduced pressure on the pump's return stroke, the bearing ring proximal portion, having elastically expanded radially on the pressure stroke, then elastically contracts to a smaller diameter. This elastic bearing ring contraction reverses the above-noted narrowing of the extrusion gap (that is, on the pump's return stroke the extrusion gap is widened). In turn, the widened gap (in combination with reduced pressure on the elastomeric seal during the return stroke) reduces frictional heat generation in and near the gap. The slightly wider extrusion gap during the return stroke also allows water sprayed generally at the back of the piston to better cleanse the liner wall of particulate matter from the pumped fluid, while at the same time cooling the piston back as well as piston and liner surfaces near the gap. The result is increased piston seal service life and reduced liner wear, leading to better overall pump performance.

A piston of the present invention reciprocates in a liner having a liner inner diameter. The piston's metallic hub (typically comprising steel) is symmetrical about a longitudinal axis and comprises a proximal transverse flange and a core section. The proximal transverse flange has a first outer diameter that is slightly less than the diameter of the peripheral bearing ring contact surface (herein termed the second diameter). The second diameter, measured as described below when the bearing ring is in an unstressed state (i.e., when the radial pressure differential across the proximal portion of the bearing ring is approximately zero), is slightly less than the liner inner diameter. A central bore extends longitudinally through the transverse flange and the core section for accommodating a piston rod. The core section extends distally from the proximal transverse flange to a core section transverse mating surface, while its radial extent is less than the outer diameter of the transverse flange (i.e., less than the first outer diameter). The core section has a peripheral surface which contacts the molded elastomeric seal and maintains the seal symmetrical about (i.e., coaxial with) the core section. The seal, in turn, maintains the bearing ring coaxial with, and spaced radially apart from, the core section peripheral surface. Simultaneously, the seal maintains the bearing ring in contact (via its base surface) with the proximal transverse flange as described below. The bearing ring extends distally from its base surface (in contact with the transverse flange) to the bearing ring distal end.

When installed on a piston rod, the piston hub's proximal transverse flange typically rests against a flange on the piston rod, and the hub is held on the piston rod by a nut which screws on to the distal end of the rod and bears on a circular retaining plate. The retaining plate comprises a center hole for coupling to the piston rod passing through the hub's central bore, the retaining plate contacting the hub's core section transverse mating surface and at least a portion of the elastomeric seal distal end for limiting distal longitudinal movement of the hub and the elastomeric seal with respect to the piston rod.

To ensure that the seal and bearing ring remained positioned as above with respect to the piston hub, the seal is molded to fit symmetrically about the hub's core section (and thus to maintain its position symmetrically about the hub longitudinal axis). Note that the seal may be molded directly on the core section, with or without bonding (as with an adhesive layer) to the core section's peripheral surface. If particularly tight coupling is desired between the seal and the core section peripheral surface, irregular peripheral surface features such as ribs and/or surface roughness may be used with or without an adhesive layer for increasing bond strength. In such (bonded seal) embodiments, piston maintenance requires replacement of the hub, seal and bearing ring together. Alternatively, the seal may be molded together with the bearing ring as a subassembly separate from the hub. In this latter embodiment, a subassembly consisting of the seal and bearing ring can be easily replaced on a hub having a core section peripheral surface that is, for example, substantially cylindrical or frusto-conical (see FIGS. 3 and 4).

Whether the seal is separately molded with the bearing ring as a subassembly for later installation on a piston hub's core section or, alternatively, the seal is molded directly on the hub's core section together with the bearing ring, the surfaces of the bearing ring in contact with the seal elastomer are the same. That is, the distal bearing ring outer surface, together with the bearing ring's inner surface and its distal end, are embedded in seal elastomer. But the proximal bearing ring outer surface, as well as the bearing ring's base surface and its peripheral bearing ring contact surface, are free of seal elastomer. The elastomeric seal fills the space between the core section peripheral surface and the bearing ring and extends distally from the hub's proximal transverse flange to an elastomeric seal distal end.

The elastomeric seal distal end comprises a circular depression symmetrical about the hub longitudinal axis. The circular depression is bounded radially by an inner circular wall and an outer circular wall. The inner circular wall extends distally as far as the core section transverse mating surface (where at least a portion of it contacts the circular retaining plate. The outer circular wall extends distally approximately (but not necessarily exactly) as far as the inner circular wall. As noted above, the circular retaining plate limits longitudinal movement of the elastomeric seal and the metallic hub with respect to a piston rod. The illustrated embodiments schematically show the retaining plate contacting both the core section transverse mating surface and the distal extent of the elastomeric seal's distal end inner circular wall. The elastomeric seal's distal end outer circular wall, on the other hand, is shown not contacting the retaining plate, giving it limited freedom of movement to maintain a smooth sliding seal with the liner wall.

Maintenance of a smooth sliding seal with the liner wall is facilitated because the outer circular wall comprises a radially protruding circumferential sealing lip having a third diameter. This third diameter is measured when the piston is not within the liner (see FIGS. 3 and 4), and the third diameter is slightly greater than the liner inner diameter. Because the third diameter is slightly greater than the liner inner diameter, the elastomeric seal's outer circular wall (including the circumferential sealing lip) is circumferentially compressed as the piston is inserted in the liner so that the circumferential sealing lip provides a smooth sliding seal against the liner wall. See, for example, the circumferential sealing lip as seen in FIG. 5A (piston within the liner).

The above distribution of seal elastomer on bearing ring surfaces facilitates four functions of the bearing ring. First, the bearing ring provides (in the proximal portion of its salient outer surface) a radially elastically expandable surface for narrowing the extrusion gap. Second, when the extrusion gap is narrowed to zero (i.e., when the proximal portion of the bearing ring's salient outer surface expands radially sufficiently to contact the liner wall), the area of contact increases the total area of bearing surface between the piston and the liner (and thus reduces the force per unit area of bearing surface). See, for example, FIG. 5B. Third, the bearing ring conducts heat away from the heat-sensitive elastomeric seal material near the extrusion gap (and from the liner itself when the bearing ring contacts the liner). And fourth, adhesion of the seal elastomer to the distal portion of the bearing ring's salient outer surface acts to reduce extrusion of the seal elastomer through the extrusion gap. These functions are discussed in greater detail below.

DETAILED DESCRIPTION OF ILLUSTRATED EMBODIMENTS

Figure 2:
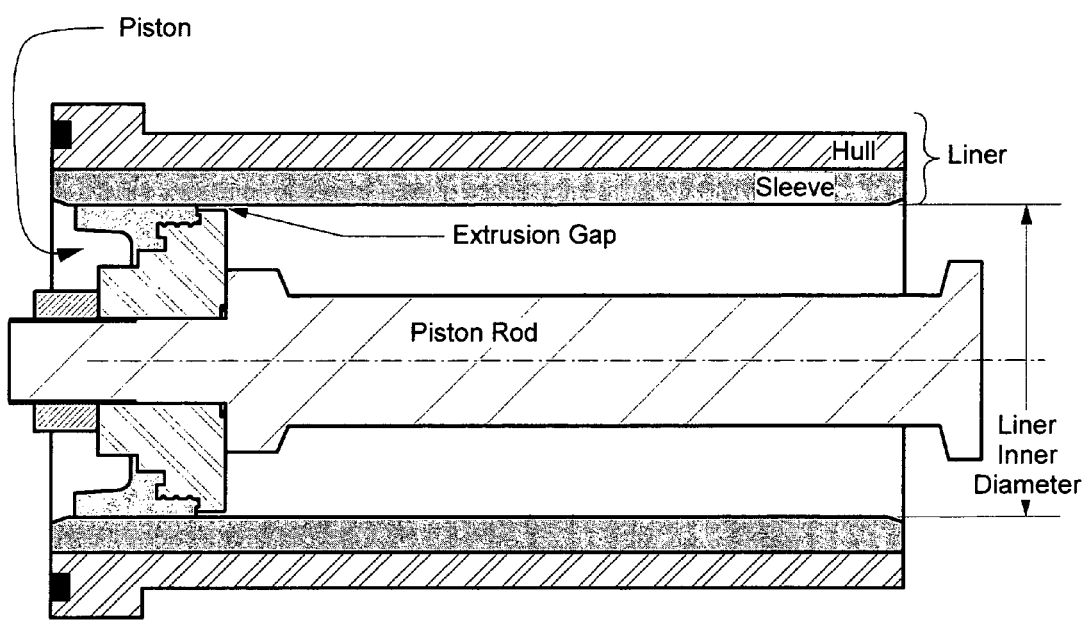
FIG. 2 schematically illustrates a cross-section of a typical mud pump liner, piston and piston rod.
Figure 3:
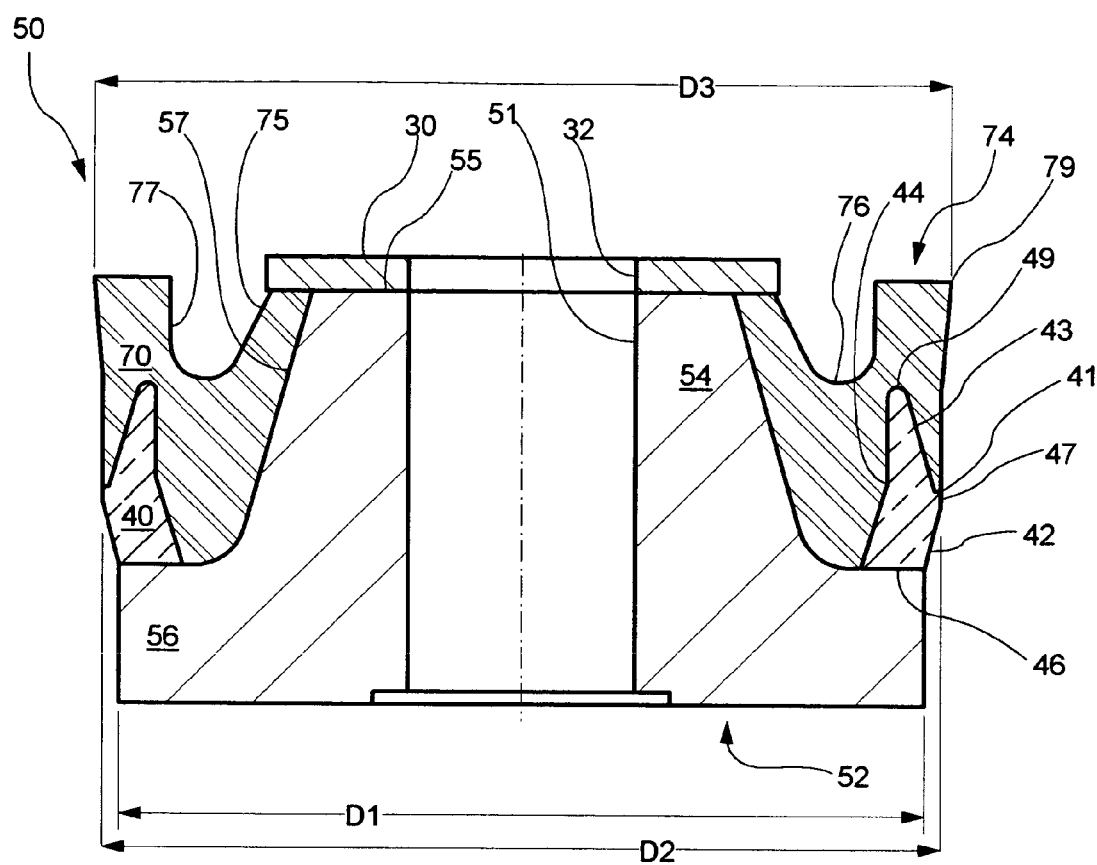
FIG. 3 is a longitudinal cross-sectional schematic view of a high pressure piston having a core section with a frusto-conical peripheral surface.

FIG. 3 schematically illustrates a cross section of a high pressure piston 50 for use within a liner for a reciprocating pump. The liner has a liner inner diameter (shown schematically in FIG. 2) and the piston 50 comprises a metallic hub 52 symmetrical about a longitudinal axis. The hub 52 comprises a proximal transverse flange 56 having a first outer diameter D1 and a core section 54 extending distally from flange 56 to core section transverse mating surface 55. Core section 54 also extends radially less than the first outer diameter D1 to a core section peripheral surface 57. Hub 52 has a central bore 51 extending longitudinally through proximal transverse flange 56 and core section 54 for accommodating a piston rod. Core section peripheral surface 57 is shown in FIG. 3 as being frusto-conical in shape.

Piston 50 further comprises a metallic bearing ring 40 having a generally annular shape and surrounding at least a portion of core section 54. Bearing ring 40 has an inner surface 44, a base surface 46 in contact with proximal transverse flange 56, a salient outer surface 41, and a bearing ring distal end 49. Salient outer surface 41 comprises a proximal bearing ring outer surface 42 and a distal bearing ring outer surface 43 separated by a peripheral bearing ring contact surface 47. When bearing ring 40 is in a resting (i.e., substantially unstressed) state, peripheral bearing ring contact surface 47 has a second diameter D2. Bearing ring 40 extends distally from proximal transverse flange 56 to bearing ring distal end 49 and is coaxial with and spaced radially apart from core section peripheral surface 57.

Piston 50 further comprises an elastomeric seal 70 molded to fit symmetrically about the hub 52 longitudinal axis for providing a sliding seal between the piston 50 and a liner. Elastomeric seal 70 fills space between bearing ring 40 and core section peripheral surface 57 and extends longitudinally and radially to cover substantially all of core section peripheral surface 57 and all surfaces of bearing ring 40 except for bearing ring base surface 46, proximal bearing ring outer surface 42, and peripheral bearing ring contact surface 47. Elastomeric seal 70 extends distally from proximal transverse flange 56 to elastomeric seal distal end 74. Elastomeric seal distal end 74 comprises a circular depression 76 symmetrical about the hub 52 longitudinal axis, circular depression 76 being bounded radially by an inner circular wall 75 and an outer circular wall 77. Inner circular wall 75 extends distally as far as core section transverse mating surface 55, and outer circular wall 77 extends distally approximately as far as inner circular wall 75. Outer circular wall 77 comprises a radially protruding circumferential sealing lip 79 having a third diameter D3. When piston 50 is not positioned within a liner (i.e., when outer circular wall 77 is not being radially compressed by contact of sealing lip 79 with a liner wall), then third diameter D3 is slightly greater than the liner inner diameter. Second diameter D2 is slightly less than the liner inner diameter, and first diameter D1 is slightly less than second diameter D2.

Piston 50 further comprises a circular retaining plate 30 comprising a center hole 32 for coupling to a piston rod passing through central bore 51. Retaining plate 30 contacts core section transverse mating surface 55 and at least a portion of elastomeric seal distal end 74 for limiting distal longitudinal movement of metallic hub 52 and elastomeric seal 70 with respect to a piston rod passing through central bore 51.

Figure 4:
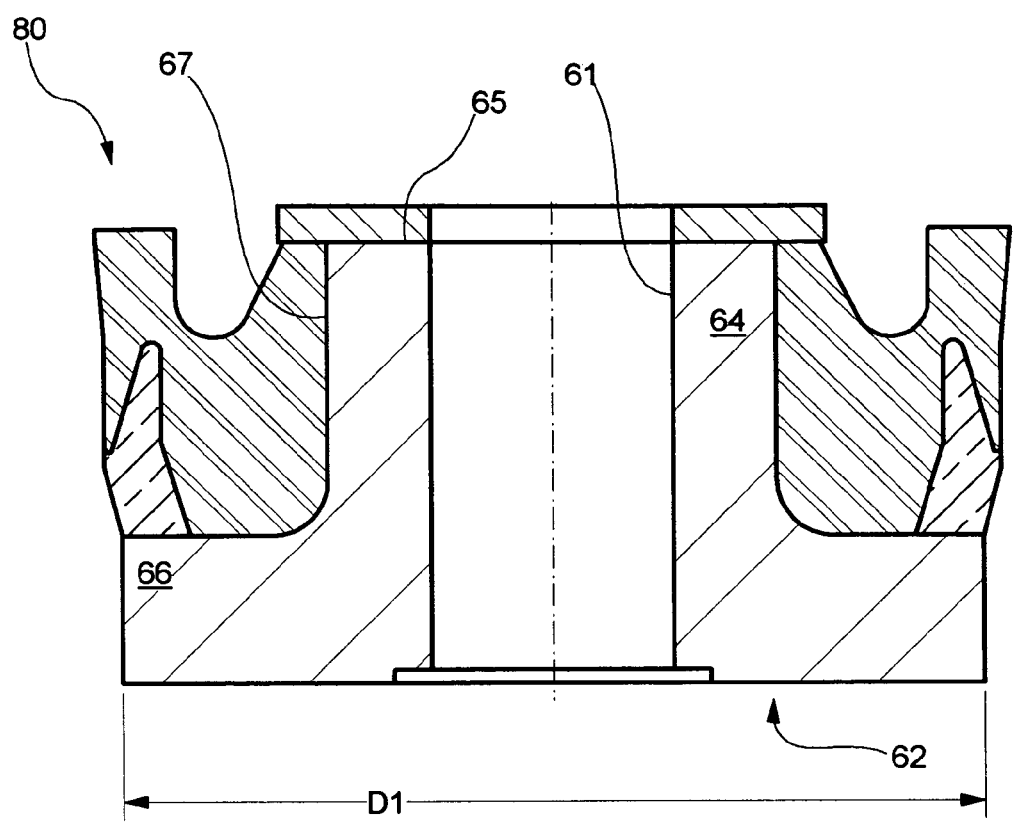
FIG. 4 is a longitudinal cross-sectional schematic view of a high pressure piston having a core section with a cylindrical peripheral surface.

Piston 80, shown in FIG. 4, is similar in construction to piston 50 described above except that piston 80 comprises a metallic hub 62 symmetrical about a longitudinal axis. The hub 62 comprises a proximal transverse flange 66 having a first outer diameter D1 and a core section 64 extending distally from flange 66 to core section transverse mating surface 65. Core section 64 also extends radially less than the first outer diameter D1 to a core section peripheral surface 67. Hub 62 has a central bore 61 extending longitudinally through proximal transverse flange 66 and core section 64 for accommodating a piston rod. Core section peripheral surface 67 is shown in FIG. 4 as being cylindrical in shape.

In each high pressure piston of the present invention support, the four bearing ring functions noted above combine to extend piston service life. To facilitate these functions, each bearing ring proximal portion comprises an elastic metallic material having relatively high heat conductivity and a low modulus of elasticity compared to the liner wall, plus a relatively low coefficient of friction against the liner wall (compared to the coefficient of friction of either the hub transverse flange or the elastomeric seal on the liner wall). If the liner wall is steel, a material such as, for example, bronze would be an appropriate choice for the bearing ring. This is because the modulus of elasticity of various bronze compositions ranges from about 14,000,000 psi to about 19,000,000 psi, which is substantially less than that of steel (about 30,000,000 psi). Thus, under high pressure (e.g., during a pump's pressure stroke) the proximal portion of a bronze bearing ring of the present invention tends to expand elastically toward contact with the liner wall (thus narrowing the extrusion gap). The mechanism of this expansion is discussed below. Further, finite element analysis (FEA) of the bearing ring expansion shows that a bronze bearing ring of the present invention would not be stressed past its yield point during its periodic expansion toward the liner wall. That is, the ring's diameter would not tend to increase permanently (i.e., to creep outward as in plastic deformation). Instead, the bearing ring diameter would tend to contract elastically to its original (i.e., substantially unstressed) dimension when high pressure is removed (i.e., on the pump's return stroke).

Further, the distal portion of the bearing ring of the present invention is embedded in (and optionally bonded via an adhesive layer to) the elastomeric piston seal material that periodically (i.e., during a pump's pressure stroke) is subjected to high pressure that forces the elastomeric seal into close sliding contact with the liner wall. Because of adhesion between the distal portion of the bearing ring's salient outer wall and the elastomeric seal material in which it is embedded, the elastomeric seal material between that outer wall portion and the liner (that is, elastomeric material near the extrusion gap), is inhibited from extruding through the gap. And simultaneously, because of the relatively high coefficient of heat transmission of bronze (roughly ten times that of steel), frictional heat generated by the piston elastomeric seal material's sliding contact with the liner wall near the extrusion gap tends to be conducted away from the extrusion gap by the bearing ring. This frictional heat is conducted by the bearing ring to the proximal flange of the piston (which the bearing ring base surface contacts). The proximal flange, in turn, may itself be cooled by a water spray on its proximal surface (i.e., on the back of the piston). Such efficient dissipation of frictional heat via the bearing ring and proximal flange tends to decrease the tendency of the piston elastomeric seal material to flow under pressure like a viscous fluid, thereby decreasing extrusion of the seal material through the gap between piston and liner wall.

As noted above, extrusion of piston elastomeric seal material is also reduced by pistons of the present invention because, as pressure on the seal material increases during a pump's pressure stroke, this rising pressure also tends to cause elastic radial expansion of the proximal portion of the bearing ring. The amount of such radial expansion is a function of the pressure of the pumped fluid, which is applied directly to the distal end of the piston's elastomeric seal. This pressure is transmitted hydraulically by the elastomeric seal material (acting as a viscous fluid) to the inner surface of the bearing ring. And since the proximal portion of the bearing ring's salient outer surface is not in contact with the elastomeric seal material, the result is a net radial outward force on the proximal portion of the bearing ring.

Other factors affecting the amount of radial elastic expansion of the proximal portion of the bearing ring include the compliance of the bearing ring in response to the net outward radial force, as well as the width of the extrusion gap into which the bearing ring elastically expands. (Note that the extrusion gap tends to widen as the liner wears).

The extrusion gap thus tends to narrow during the pump pressure stroke, counteracting the increased tendency of the seal elastomer to extrude into the gap under the relatively higher pressures on the seal elastomer that are developed during the pressure stroke. On the return stroke, in contrast, the pressure of the pumped fluid (and thus pressure on the seal elastomer) is relatively lower. This lower pressure leads to widening of the extrusion gap due to elastic radial contraction of the proximal portion of the bearing ring. Notwithstanding the wider extrusion gap however, the tendency of the seal elastomer to extrude into the gap is simultaneously reduced as a function of the relatively lower pressure of the pumped fluid (and therefore the relatively lower pressure on the elastomeric seal) during the return stroke. Thus, a high pressure piston of the present invention adapts to both changes in operating pressure and to liner wear in reducing seal extrusion through periodic expansion of its bearing ring proximal portion to temporarily narrow the extrusion gap.

When a piston of the present invention (piston 50, for example) is at rest (i.e., substantially unstressed) within a liner with equal pressures proximal and distal to the piston, the piston 50 is kept approximately centered within the liner by circumferential contact of its elastomeric seal 70 with the liner wall. Under this equal-pressure condition, the peripheral bearing ring contact surface 47 does not touch the liner wall because its resting (i.e., unexpanded) diameter (i.e., the second diameter) is slightly less than the liner inner diameter. Further, the proximal transverse flange 56 of hub 52 does not touch the liner wall either because its diameter (i.e., the first diameter) is slightly less than the second diameter. See, e.g., FIG. 5A.

However, as distal pressure on piston 50 increases relative to proximal pressure on piston 50 (e.g., during a pump's pressure stroke), the result is a substantially uniformly distributed net outward radial force on the proximal area 45 of inner surface 44 of bearing ring 40 that causes proximal portion 25 of bearing ring 40 to elastically expand radially (which initially narrows and ultimately closes the extrusion gap). This radial force is due to the difference between the distal piston pressure (transmitted hydraulically by the elastomeric material of seal 70 to the proximal area 45 of inner surface 44 of bearing ring 40) and the proximal piston pressure (which bears on the proximal area 42 of the bearing ring's salient outer surface 41 via the space between the transverse flange 56 of hub 52 and the liner wall). The radial force resulting from the above pressure differential tends to narrow, and ultimately to close, the extrusion gap during a pump pressure stroke. As the pressure differential increases and the extrusion gap narrows, the bearing ring peripheral contact surface 47 is brought closer to the liner wall. Should the pressure differential increase sufficiently for the bearing ring to contact the liner wall, the resulting increase in frictional heat generation is relatively small because of the relatively low coefficient of friction of the bearing ring metal (e.g., bronze) on the metal of the liner wall (e.g., steel). This coefficient of friction (e.g., about 0.45) is low relative to the coefficient of friction of the elastomeric material of seal 70 on the liner wall.

Note that throughout the above-described closure of the extrusion gap by an expanded bearing ring, the substantially uniform circumferential expansion of the proximal portion of the bearing ring keeps the piston hub substantially centered within the liner. This prevents contact of the (typically steel) proximal flange of the hub, with the (typically steel) liner wall. Should such steel-on-steel contact occur, it would produce significant additional frictional heat because the coefficient of friction of steel on steel is about 0.8. Further, galling of the contacting steel surfaces would likely occur, leading to premature failure of both the piston and the liner.

As seen in the illustrated embodiments of the present invention, the bearing ring's salient outer surface is generally bowed outward and may, as noted above, comprise smoothly-curved, angular, and/or cylindrical areas. Smoothly curved areas of the outer surface are analogous to the surface of a convex lens, while angular areas of the outer surface have longitudinal cross-sections suggestive of a convex polygon (i.e., a polygon having interior angles less than 180 degrees). Transition areas between smoothly curved and/or angular areas of the outer surface may comprise relatively small cylindrical areas.

The bearing ring's inner surface may, in contrast to the outer surface, be substantially cylindrical or reentrant. The term reentrant, as used herein to describe the bearing ring inner surface, means generally bowed inward and comprising smoothly-curved, angular, and/or cylindrical areas. Smoothly curved areas of the bearing ring's inner surface are analogous to the surface of a concave lens, while angular areas of the inner surface have longitudinal cross-sections suggestive of a concave polygon (i.e., a polygon having interior angles greater than 180 degrees). Transition areas between smoothly curved and/or angular areas of the inner surface may comprise relatively small cylindrical areas.

Figure 5A:
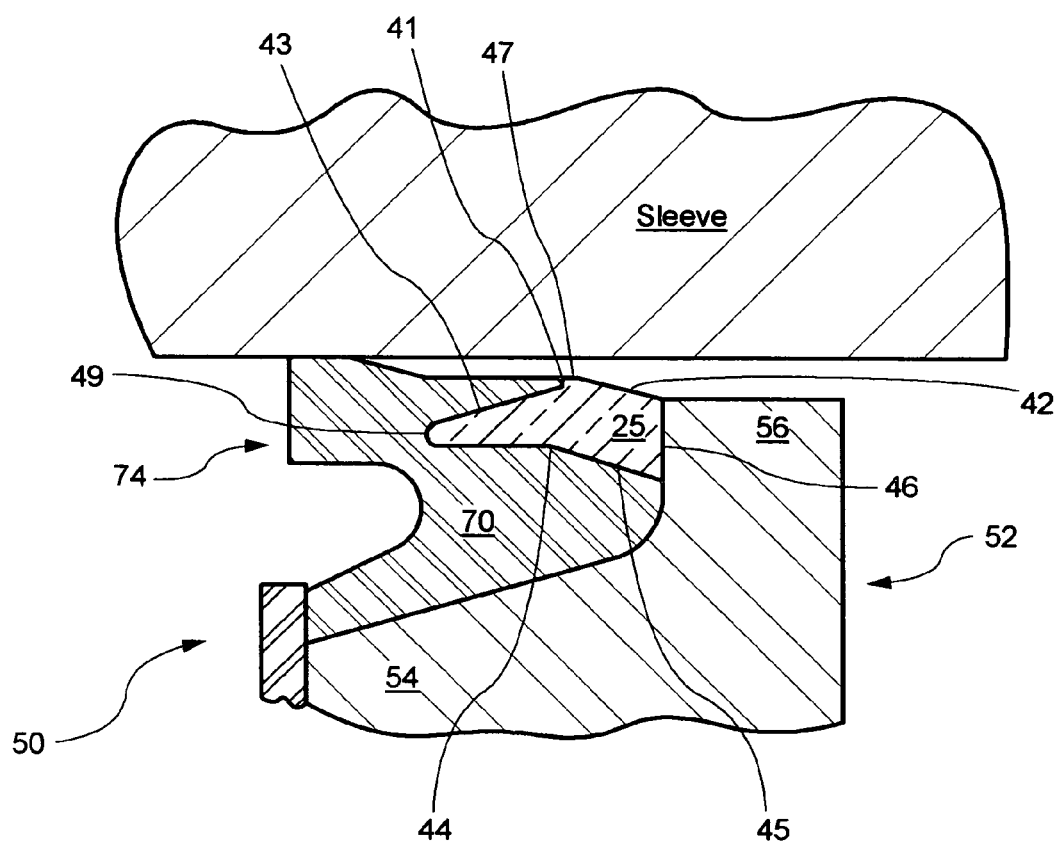
FIG. 5A is a partial longitudinal cross-sectional schematic view of the high pressure piston of FIG. 3 on its return (or low pressure) stroke.
Figure 5B:
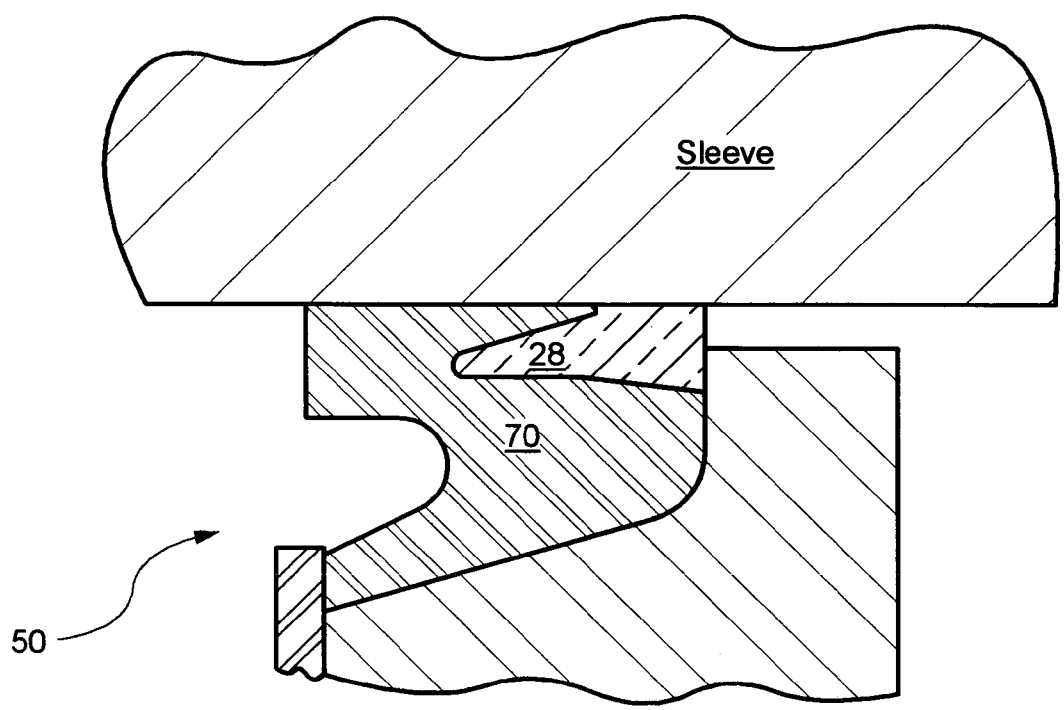
FIG. 5B is a partial longitudinal cross-sectional schematic view of the high pressure piston of FIG. 3 on its pressure stroke, showing expansion of the bearing ring.

As noted above, the piston seal elastomer in which the bearing ring's inner surface, its distal end, and the distal portion of its salient outer surface are embedded tends to maintain the bearing ring's proper position (i.e., coaxial with the hub longitudinal axis and with the bearing ring base surface in contact with the hub's transverse flange). The bearing ring's salient outer surface may comprise, for example (and as illustrated herein), proximal and distal frusto-conical tapered areas (i.e., angular areas) separated by a peripheral bearing ring contact surface. The peripheral bearing ring contact surface may in turn comprise a transition area that itself comprises a small cylindrical portion. Thus, the peripheral bearing ring contact surface facilitates the bearing ring's smooth sliding interface with the liner wall during the pump's pressure stroke. Note, as illustrated in FIGS. 5A and 5B, that as the proximal portion of bearing ring 40 expands, its base surface 46 remains in contact with transverse flange 56 to facilitate heat transfer from bearing ring 40 to transverse flange 56. Heat may then be extracted from transverse flange 56 by, for example, a water spray on its back side.

In the illustrated piston embodiments, the proximal frusto-conical tapered area 42 of the salient outer surface 41 of bearing ring 40 is generally bowed-outward because it extends distally and radially outwardly from the bearing ring base surface 46 to the peripheral bearing ring contact surface 47. The distal frusto-conical tapered area 43 of the salient outer surface 41 of bearing ring 40 extends distally and radially inwardly from the peripheral bearing ring contact surface 47 to the bearing ring distal end 49.

Figure 1:
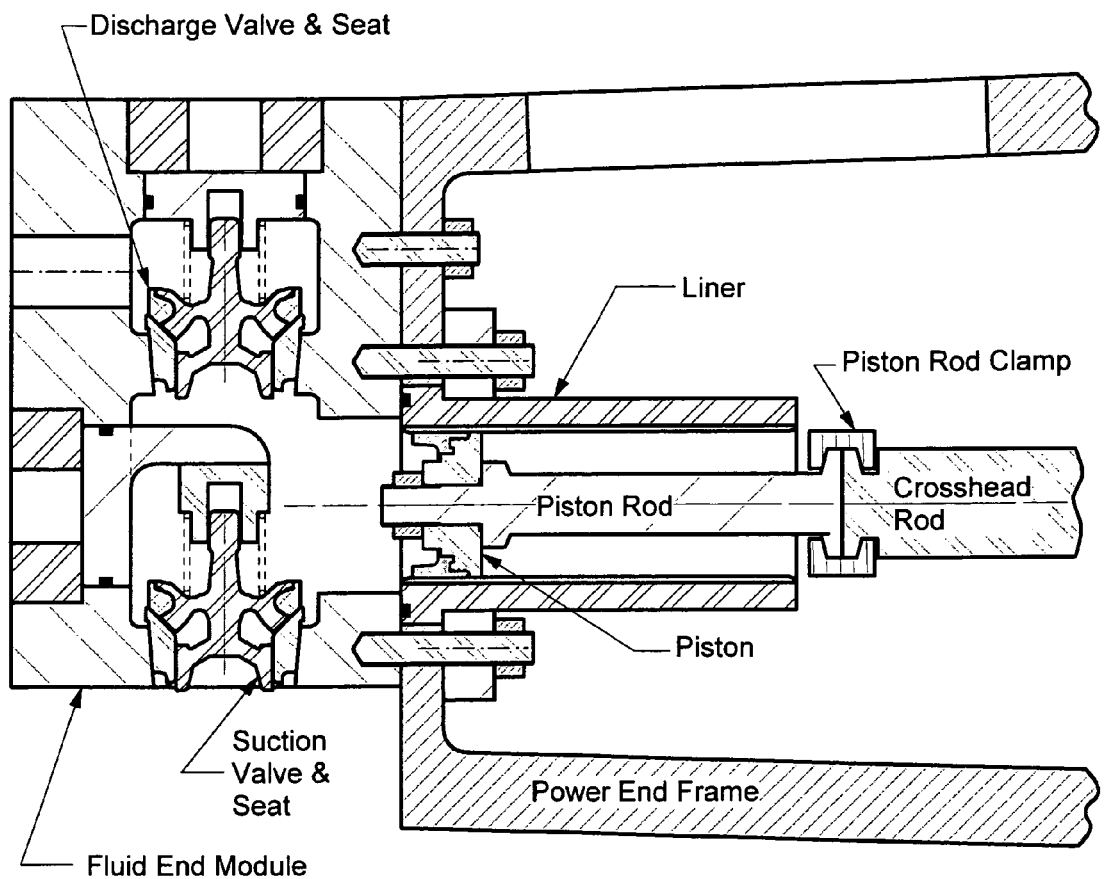
FIG. 1 is a cross-sectional schematic view of a typical mud pump fluid end housing showing its connection to a power end frame.

When high pressure acts on the elastomeric seal of a piston of the present invention (e.g., seal 70), the elastomeric flow phenomenon noted above means that the behavior of the elastomeric material of seal 70 becomes analogous to that of an exceptionally thick viscous fluid. Actual bulk movement of the elastomeric material of seal 70 is substantially restricted by its inherent shape-retaining properties (as seen in, e.g., relatively stiff urethanes) and/or by reinforcing components within the elastomeric material such as fabric and/or relatively stiffer urethanes (not shown). But where very little movement is allowed (e.g., on the order of hundred's of microns) in any of the structures restraining the elastomeric material of seal 70, pressure applied to the distal end 74 of seal 70 during a piston pressure stroke (typically several thousand psi) tends to be transmitted substantially undiminished in all directions throughout the elastomeric material of seal 70. Thus, pressurized elastomeric material of seal 70 contacting proximal area 45 of inner surface 44 of bearing ring 40 at points radially inward from the proximal frusto-conical tapered area 42 of the bearing ring's salient outer surface 41 will exert a net outward pressure tending to expand or flare out the proximal portion 25 of bearing ring 40, the pressure magnitude being nearly equal to that of the pressure applied to the distal end 74 of seal 70 during the piston pressure stroke. The net outwardly-directed pressure results from the fact that the opposing pressure on the proximal area 42 of the salient outer surface 41 of bearing ring 40 will approximate atmospheric pressure (typically less than 15 psi) if the proximal end of the liner is open to the atmosphere (see, e.g., FIG. 1). Regardless of a piston's position within the liner, this opposing pressure proximal to the piston quickly equalizes through the space separating the piston's transverse flange and the liner wall with ambient pressure proximal to the piston.

Note that as schematically illustrated in FIG. 5B, the net radial (differential) force acting on distal portion 28 of bearing ring 40 is approximately zero during the pump's pressure stroke. This is because distal portion 28 is completely embedded in the elastomeric material of seal 70. When this elastomeric material is pressurized it tends to behave, as noted above, as a viscous fluid that transmits pressures applied to it equally in all directions. Thus, since the radial components of pressurized elastomeric material in contact with (and thus acting on) distal portion 28 of bearing ring 40 are substantially equal in magnitude and opposite in direction, they tend to cancel. Further, the intimate contact of distal portion 28 of bearing ring 40 with the elastomeric material of seal 70 restricts movement of distal portion 28, thus tending to stabilize the position of bearing ring 40 with respect to hub 52 notwithstanding the cyclic radial expansion and contraction of proximal portion 25. And the relatively high thermal conductivity of the bearing ring 40 as a whole simultaneously facilitates heat scavenging from the elastomeric material of seal 70.

As noted above, the periodic outward expansion of the proximal portion of a bearing ring of the present invention during a pump's pressure stroke approximates a flaring motion. That is, the greatest radial outward displacement during expansion of the bearing ring occurs at the bearing ring's proximal end (i.e., its base surface), while lesser radial outward displacement occurs more distally (i.e., nearer the bearing ring's peripheral bearing ring contact surface). Thus, although the peripheral bearing ring contact surface is relatively closer to the liner at the beginning of a pump pressure stroke (i.e., when proximal and distal pressures on the piston are approximately equal), the peripheral bearing ring contact surface may not contact the liner before the proximal end of the bearing ring. The order of such bearing ring-liner contact is a function of liner wear, but the order does not have a significant effect on the benefits of reduced seal extrusion obtained through use of the present invention. This is because the extrusion gap width at the time of initial bearing ring-liner contact has been significantly narrowed (compared to the extrusion gap width when pressures proximal and distal to a piston are equal). Hence, regardless of the order of contact, seal extrusion through the narrowed gap during a pump's pressure stroke is substantially impeded.

When, during a pump pressure stroke, any portion of the outer surface of the bearing ring actually touches the liner wall (i.e., reducing the extrusion gap to zero), any continuing increase in pump pressure tends to bring more of the bearing ring's salient outer surface closer to contact with the liner wall. Note that under high-pump-pressure conditions where the peripheral bearing ring contact surface and substantially the entire outer surface of the proximal portion of the bearing ring comes into contact with the liner wall (as shown schematically in FIG. 5B), the total bearing ring surface area at the piston-liner interface is maximized, thus tending to reduce radial force per unit of bearing contact area. The result is relatively less wear of both the piston and the liner under high-pressure conditions when compared to earlier piston designs.

What is claimed is:

1. A high pressure piston for use within a liner for a reciprocating pump, the liner having a liner inner diameter and the piston comprising:
   a metallic hub symmetrical about a longitudinal axis, said hub comprising
   a proximal transverse flange having a first outer diameter;
   a core section extending distally from said proximal transverse flange to a core section transverse mating surface and extending radially less than said first outer diameter to a core section peripheral surface; and
   a central bore extending longitudinally through said proximal transverse flange and said core section for accommodating a piston rod;
   a metallic bearing ring having an annular shape and surrounding a portion of said core section, said bearing ring having an inner surface, a base surface in contact with said proximal transverse flange, a salient outer surface, and a bearing ring distal end, said salient outer surface comprising a proximal bearing ring outer surface and a distal bearing ring outer surface separated by a peripheral bearing ring contact surface, said peripheral bearing ring contact surface having a second diameter, said bearing ring extending distally from said proximal transverse flange to said bearing ring distal end and being coaxial with and spaced radially apart from said core section peripheral surface;
   an elastomeric seal molded to fit symmetrically about said metallic hub longitudinal axis for providing a sliding seal between the piston and the liner, said elastomeric seal filling space between said bearing ring and said core section peripheral surface and extending longitudinally and radially to cover substantially all of said core section peripheral surface and all surfaces of said bearing ring except for said bearing ring base surface, said proximal bearing ring outer surface, and said peripheral bearing ring contact surface, said elastomeric seal extending distally from said proximal transverse flange to an elastomeric seal distal end, said elastomeric seal distal end comprising a circular depression symmetrical about said hub longitudinal axis, said circular depression being bounded radially by an inner circular wall and an outer circular wall, said inner circular wall extending distally as far as said core section transverse mating surface, and said outer circular wall extending distally approximately as far as said inner circular wall; and a circular retaining plate comprising a center hole for coupling to a piston rod passing through said central bore, said retaining plate contacting said core section transverse mating surface and at least a portion of said elastomeric seal distal end for limiting distal longitudinal movement of said metallic hub and said elastomeric seal with respect to said piston rod;

wherein said outer circular wall of said elastomeric seal distal end comprises a radially protruding circumferential sealing lip having a third diameter; and wherein said third diameter is slightly greater than said liner inner diameter, said second diameter is slightly less than said liner inner diameter, and said first diameter is slightly less than said second diameter.

2. The high pressure piston of claim 1 wherein said core section peripheral surface is substantially frusto-conical.

3. The high pressure piston of claim 1 wherein said core section peripheral surface is substantially cylindrical.

4. The high pressure piston of claim 1 wherein said bearing ring inner surface is substantially cylindrical.

5. The high pressure piston of claim 1 wherein said bearing ring inner surface is substantially concave.

6. The high pressure piston of claim 1 wherein said bearing ring comprises bronze.

7. The high pressure piston of claim 1 wherein said elastomeric seal comprises urethane.

* * * * *